United States Patent [19]

Zalas

[11] 4,301,890
[45] Nov. 24, 1981

[54] SOUND-ABSORBING PANEL

[75] Inventor: John M. Zalas, Erie, Pa.

[73] Assignee: Lord Corporation, Erie, Pa.

[21] Appl. No.: 100,809

[22] Filed: Dec. 6, 1979

[51] Int. Cl.³ .............................................. E04B 1/82
[52] U.S. Cl. .................................. 181/286; 181/288; 181/291
[58] Field of Search ............... 181/286, 288, 291, 292

[56] References Cited

U.S. PATENT DOCUMENTS

| | | | |
|---|---|---|---|
| 2,140,210 | 12/1938 | Schenk | 181/291 |
| 2,413,568 | 12/1946 | Hurley | 181/291 |
| 3,380,206 | 4/1968 | Barnett | 181/292 |
| 3,504,761 | 4/1970 | Sullivan et al. | 181/292 |

*Primary Examiner*—L. T. Hix
*Assistant Examiner*—Benjamin R. Fuller
*Attorney, Agent, or Firm*—Thomas H. Murray

[57] ABSTRACT

A non-porous, sound-absorbing panel which can be readily cleaned and which is intended for use in high humidity, sanitary environments. The panel comprises two non-porous membranes or panels bonded to opposite sides of a honeycomb structure. At least one membrane is formed of sound-absorbing material with the membrane natural frequency, the membrane/honeycomb cavity natural frequency and the standing wave natural frequency of the honeycomb cavities being closely matched. In a preferred embodiment of the invention, the membrane comprises a polyurethane panel; while the honeycomb structure is formed from phenolic impregnated paper.

7 Claims, 6 Drawing Figures

SOUND-ABSORBING PANEL

BACKGROUND OF THE INVENTION

As is known, sound-absorbing panels for ceilings and walls have been provided in the past in which a membrane is mounted on a sound-damping porous layer of glass fibers, rock wool or a honeycomb structure. In one type of prior art sound-absorbing panel of this type, a membrane which covers a honeycomb structure is porous such that the sound waves can pass through the membrane and effectively become trapped within the honeycomb cells. These are effective over a relatively wide range of sound frequencies, including the higher frequencies. Other types of prior art panels use non-porous membranes in combination with glass fiber or rock wool backings, but these are severely limited in their high frequency response.

While effective at the higher frequencies, one difficulty with panels employing porous membranes is that they cannot be used for noise reduction in rooms requiring a high degree of sanitation. That is, porous sound absorbers can easily become contaminated with undesirable pollutants such as water, oil, dirt and the like. More importantly, the porous sound absorbers provide a place for fungus, mold, bacteria and other undesirable living organisms. Such conditions cannot be tolerated in highly sanitary environments such as food-processing plants, breweries, soft-drink plants and the like.

Heretofore, many different proposals have been advanced in an effort to make porous materials suitable as sound absorbers in sanitary environments. Commonly, these include covering the porous material with thin, non-porous polymeric membranes such as Mylar, Tedlar or polyethylene. While these membranes provide some protection for the porous material, they degrade its acoustical performance, especially at higher frequencies. Also, these protective materials must be relatively thin so as not to seriously degrade the sound-absorption characteristics of the porous material. This requirement makes these materials susceptible to puncture and, hence, exposure of the porous material to the surrounding environment. As a consequence, current FDA and USDA requirements preclude their use in sanitary environments.

Another class of sound absorber which has been proposed for sanitary environments utilizes cells or slots in a specific geometry to achieve noise reduction. While these cells or slots can be covered with a porous layer, their sound-reducing properties are seriously degraded if they are covered with a non-porous layer. Another disadvantage of these cellular and slotted absorbers is that the cells and slots can provide areas for organic growth and are not easily cleanable. Furthermore, cellular and slotted absorbers are relatively expensive and heavy so as to be undesirable for use as ceiling tiles.

SUMMARY OF THE INVENTION

In accordance with the present invention, new sound-absorbing devices are provided for sanitary environments which overcome or substantially reduce the disadvantages of the prior art devices set forth above. The sound-absorbing element of the invention is simple, inexpensive and is characterized by high broadband absorption with a non-porous cleanable surface.

Specifically, the sound-absorbing panel of the invention comprises a honeycomb-like core having cavities formed therein and having bonded to its opposite sides non-porous, cleanable panels. At least one of the panels which is subjected to acoustic vibrations must be formed from a flexible membrane whose natural frequency of vibration is substantially the same as both (1) the natural frequency of vibration of the membrane in combination with a cavity in the honeycomb core and (2) the standing wave frequency of the cavity itself. In contrast to prior art devices wherein fibrous materials absorb sound to cause air molecules to move relative to the fibers and transform acoustic energy into heat through friction, the present invention derives its acoustic absorption from hysteretic damping associated with the flexing of the membrane itself. Thus, the membrane is the primary sound-absorbing element; and by the proper selection of the membrane properties and the honeycomb geometry, the amplitude of the membrane vibration can be enhanced to give high broadband absorption.

The above and other objects and features of the invention will become apparent from the following detailed description taken in connection with the accompanying drawings which form a part of this specification, and in which.

Figure 1:
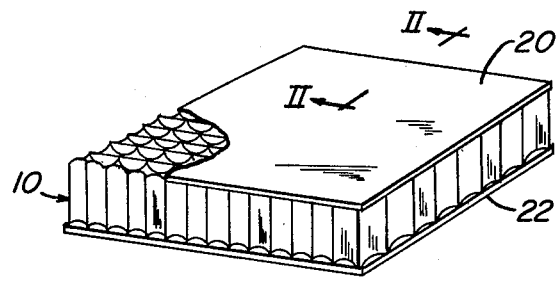
FIG. 1 is a perspective view of a sanitary sound-absorbing element constituting a preferred embodiment of the invention.
Figure 2:
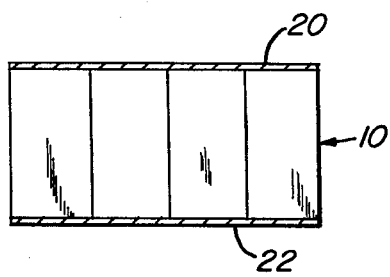
FIG. 2 is a cross-sectional view of the element shown in FIG. 1 taken substantially along line II—II of FIG. 1.
Figure 3:
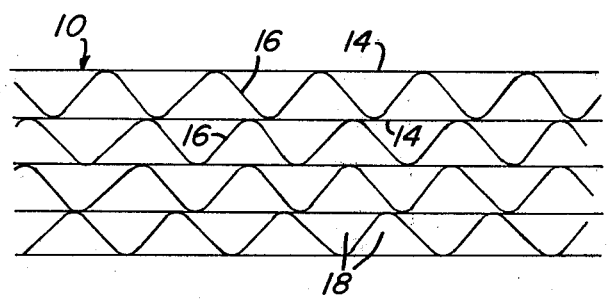
FIG. 3 is a top or plan view of the honeycomb structure utilized in the embodiment of the invention shown in FIG. 1.

With reference now to the drawings, and particularly to FIGS. 1–3, the sound-absorbing panel shown comprises a honeycomb core 10, the details of which are shown in FIG. 3. It comprises essentially parallel strips 14 of phenolic impregnated paper bonded to and interconnected by serpentine strips 16 of the same type of paper. In a typical example, the strips 14 and 16 are about 1.5 inches in thickness; while the cells 18 formed by the serpentine strips 16 typically have a cross-sectional area equivalent to a circular area having a diameter of about ½ inch.

Bonded to the upper and lower sides of the honeycomb core are two flexible membranes 20 and 22 bonded by an adhesive to the upper and lower edges of the strips 14 and 16. The adhesive can be any one of a number of commercially available adhesives such as a neoprene rubber-base adhesive. It is important, however, that the adhesive be applied to the edges of the strips 14 and 16 first and that the membranes 20 and 22 thereafter be pressed in place. Otherwise, if the adhesive were to cover the entire surface of the membrane, it could seriously change and/or degrade the acoustical properties of the absorber.

Various types of cellular structures can be used as the honeycomb core, the major requirement being a cellular structure which is relatively rigid in comparison to the flexible membrane bonded thereto. The cavities in the cellular structure define structural boundaries for individual membrane sound-absorbing segments. These individual membrane segments, in combination with their associated cavities, each cooperate to absorb sound in a manner hereinafter described.

It is fairly well known that when fibrous materials absorb sound, the sound waves cause air molecules to move relative to the fibers, thereby transforming acoustic energy into heat through friction. In contrast, the present invention derives its acoustic absorption from the hysteretic damping associated with the flexing of the membrane 20 or 22 itself. The amount of dissipation that occurs depends upon the amplitude of the membrane flexure over each of the cells 18 as it is excited by a sound wave. In contrast to prior art absorbers, therefore, the membrane 20 or 22 which faces the impinging sound energy is the primary sound-absorbing element. However, in order to effectively attenuate the sound, the natural resonant frequency of the membrane 20 or 22, the natural resonant frequency of the membrane in combination with a cavity 18, and the natural resonant frequency of the standing waves within the cavities 18 should be closely matched. In this manner, high broadband absorption can be achieved. The membrane natural frequency is given by:

$$f_m = 0.47 \frac{t}{a^2} \sqrt{E/(1-\sigma^2)} \text{ Hz} \quad (1)$$

The combination membrane/cavity natural frequency is given by:

$$f_c = 60/\sqrt{Md} \text{ Hz} \quad (2)$$

The cell standing wave natural frequency is given by:

$$f_s \approx 340/3d \quad (3)$$

where:
$f_m$ = membrane natural frequency in Hz;
t = membrane thickness in meters;
a = membrane radius in meters (i.e., the radius of a circle having an area equal to the cross-sectional area of a cell 18);
E = elastic modulus of membrane in Newtons/square meter;
$\rho$ = membrane density in kilograms/cubic meter;
$\sigma$ = Poisson's ratio of membrane;
$f_c$ = combination membrane/cavity natural frequency in Hz;
M = equivalent surface mass of membrane in kilograms/square meter;

$$M = \frac{M_1 M_2}{(M_1 + M_2)}$$

$M_1, M_2$ = surface masses, respectively, of the two membranes in kilograms/square meter;
d = honeycomb thickness in meters; and
$f_s$ = frequency between the first quarter-wave and first half-wave standing wave resonance in Hz.

In a preferred embodiment of the invention, the material for the membranes 20 and 22 comprises a polyurethane film 1.5 mils thick having the following properties:

$t = 3.8 \times 10^{-5}$ meters;
$E = 10^9$ Newtons/square meter;
$\rho = 1.24 \times 10^3$ kilograms/cubic meter; and
$\sigma = 0.4$ As indicated above, the honeycomb structure 10 is preferably about 1.5 inches thick with an equivalent ½ inch cell "diameter". Instead of using polyurethane, however, any plastic membrane can be used which has a density between 49 lb/ft³ and 107 lb/ft³, an elastic modulus between 1000 psi and $25 \times 10^5$ psi, and a loss tangent between 0.01 and 1.0.

Figure 5:
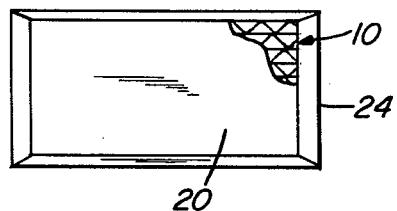
FIG. 5 is a plan view of the sanitary sound-absorbing element incorporating a frame.
Figure 6:
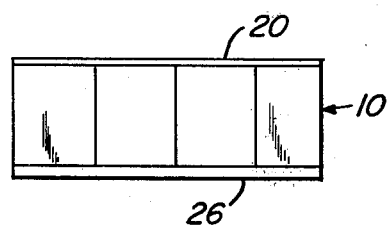
FIG. 6 is a cross-sectional view of another embodiment of the invention incorporating a flexible membrane on one side of a honeycomb core facing the incident sound waves and a rigid backing on the other side which faces away from the incident sound waves.

FIG. 5 illustrates the sanitary sound-absorbing element of the invention to which is bonded a surrounding frame 24 so as to completely encapsulate the honeycomb, thereby making the entire element non-porous and water immersible. In FIG. 6, another embodiment of the invention is shown which is similar to that of FIGS. 1 and 2 but wherein the membrane 22 is replaced by a rigid backing plate 26 which may, for example, be a non-porous material such as steel or plastic. The sound waves, of course, must be directed toward the front panel 20 which is flexible so as to be capable of absorbing sound energy.

Figure 4:
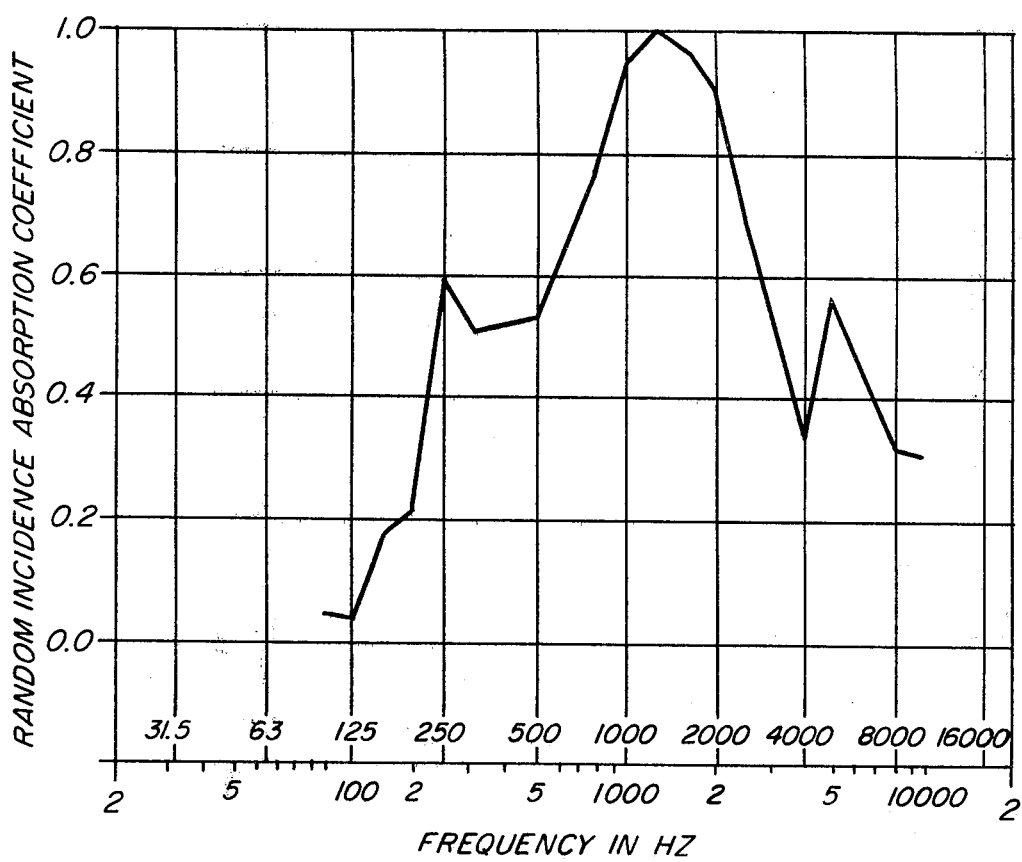
FIG. 4 is a plot of frequency versus absorption coefficient showing the high absorption achieved over a broad frequency range by sound-absorbing elements constructed in accordance with the invention.

In FIG. 4, the acoustical results for the embodiment of FIG. 6 are illustrated. It will be noted that maximum absorption occurs at a frequency of approximately 1000 hertz; however reasonably good absorption is achieved between about 200 hertz and 4000 hertz. The data given in FIG. 4 was derived from a sound-absorbing panel having a honeycomb structure one and one-half inches thick and bonded on its upper side to a 1.5 mil polyurethane film having the properties given above.

Although the invention has been shown in connection with certain specific embodiments, it will be readily apparent to those skilled in the art that various changes in form and arrangement of parts may be made to suit requirements without departing from the spirit and scope of the invention. In this regard, it will be appreciated that a number of different honeycomb materials and membrane materials can be used. By way of example, an aluminum honeycomb with hexagonal cells or a plastic honeycomb with square, rectangular or round cells can be used equally as well.

I claim as my invention:

1. A sound-absorbing panel comprising a honeycomb core having cavities formed therein and having bonded to its opposite sides non-porous panels, at least one of said panels which is subjected to acoustic vibrations being formed from a flexible membrane whose natural frequency of vibration is substantially the same as both the natural frequency of vibration of the membrane in combination with a cavity in the honeycomb core and the standing wave natural frequency of the cavity itself.

2. The sound-absorbing panel of claim 1 wherein said flexible membrane comprises a film of polyurethane having a thickness of about $3.8 \times 10^{-5}$ meters, an elastic modulus of about $10^9$ Newtons per square meter, a membrane density of about $1.24 \times 10^3$ kilograms per cubic meter, and a Poisson's ratio of about 0.4.

3. The sound-absorbing panel of claim 1 including a frame surrounding the periphery of the panel and bonded thereto so as to completely encapsulate said honeycomb core.

4. The sound-absorbing panel of claim 1 wherein one of said panels comprises a rigid backing.

5. A sound-absorbing panel comprising a honeycomb core having cavities formed therein and having bonded to its opposite sides non-porous panels, at least one of said panels which is subjected to acoustic vibrations being formed from a flexible membrane which absorbs acoustic vibrations from the hysteretic damping associated with flexing of the membrane itself.

6. The sound-absorbing panel of claim 5 wherein said one panel subjected to acoustic vibrations is formed from a plastic material having a density between 49 lb/ft$^3$ and 107 lb/ft$^3$ and an elastic modulus between 1000 psi and $25 \times 10^5$ psi.

7. The sound-absorbing panel of claim 6 wherein said plastic material has a loss tangent between 0.01 and 1.0.

* * * * *